United States Patent [19]

Scharifker et al.

[11] Patent Number: 5,051,156

[45] Date of Patent: Sep. 24, 1991

[54] ELECTROCATALYST FOR THE OXIDATION OF METHANE AND AN ELECTROCATALYTIC PROCESS

[75] Inventors: Benjamin Scharifker, Santa Eduvigis; Omar Yepez, La Carlota; Juan Carlos De Jesus; Maria M. Ramirez De Agudelo, both of Los Teques, all of Venezuela

[73] Assignee: Intevep, S.A., Caracas, Venezuela

[21] Appl. No.: 472,867

[22] Filed: Jan. 31, 1990

[51] Int. Cl.$^5$ .............................................. C23B 3/02
[52] U.S. Cl. .......................... 204/80; 204/290 R; 204/282; 204/284; 502/330; 502/331; 502/313; 502/315; 502/316; 502/317; 502/305; 502/325; 502/337; 502/338
[58] Field of Search .................. 204/290 R, 291, 292, 204/293, 294, 283, 282, 284, 80, 78; 502/330, 331, 313, 315, 316, 317, 305, 325, 337, 338

[56] References Cited

U.S. PATENT DOCUMENTS

| | | |
|---|---|---|
| 4,205,194 | 5/1980 | Mitchell, III et al. .............. 585/500 |
| 4,778,578 | 10/1988 | Nidola et al. ....................... 204/283 |
| 4,794,054 | 12/1988 | Ito et al. ................................ 429/44 |
| 4,802,958 | 2/1989 | Mazanec et al. ...................... 204/80 |

Primary Examiner—John F. Niebling
Assistant Examiner—Kathryn Gorgos
Attorney, Agent, or Firm—Bachman & LaPointe

[57] ABSTRACT

An electrocatalytic process for the partial oxidation of methane employs an electrocatalyst in the form of a deposit catalyst comprising an electrode having a conducting catalyst layer deposited thereon. The catalyst comprises an element selected from the group consisting of Group IB metals, Group VIB metals, Group VIII metals and mixtures thereof.

33 Claims, No Drawings

ELECTROCATALYST FOR THE OXIDATION OF METHANE AND AN ELECTROCATALYTIC PROCESS

BACKGROUND OF THE INVENTION

The present invention is drawn to an improved electrocatalyst and an improved electrocatalytic process and, more particularly, a composite electrocatalyst for use in the partial oxidation of methane by an electrocatalytic process.

Methane, the principal component of natural gas, is available in large quantities in wellhead gas and other by-products of petroleum recovery and coal mining processes. One of the major businesses of many refineries and chemical plants is to upgrade low value hydrocarbons such as methane into more valuable products. Typical methane conversion processes known in the prior art are disclosed in U.S. Pat. Nos. 4,205,194, 4,499,322 and 4,523,049. These processes rely on contacting the methane with a catalyst reagent in the presence of oxygen to produce a higher hydrocarbon product. These processes suffer from a number of drawbacks including low conversion rates, great catalyst instability, excessive formation of undesirable carbon oxides and the like.

Naturally, it would be highly desirable to develop a stable catalyst useful in the oxidation of methane and a method for the oxidation of methane which exhibits excellent conversion rates without excessive formation of deleterious carbon oxides.

Accordingly, it is a principal object of the present invention to provide an improved electrocatalytic process for the partial oxidation of a methane containing gas.

It is a particular object of the present invention to provide an improved electrocatalyst for use in the electrocatalytic process as set forth above.

It is a still further object of the present invention to provide an improved electrocatalyst comprising a composite electrocatalyst comprising a electrode having a finely dispersed conducting catalyst disposed thereon.

Further objects and advantages of the present invention will appear hereinbelow.

SUMMARY OF THE INVENTION

The present invention is drawn to an improved electrocatalyst and an improved electrocatalytic process for converting methane to higher value hydrocarbons by the partial oxidation thereof.

The electrocatalyst of the present invention comprises a composite electrocatalyst consisting of an electrode having a finely dispersed conducting catalyst layer deposited thereon. The electrode comprises a material selected from the group consisting of metals, metal alloys, non-metal conducting materials and mixtures thereof. In accordance with the present invention, the metals and metal alloys used in forming the electrode of the composite electrocatalyst contain an element selected from the group consisting of Group IB metals, Group VIB metals, Group VIII metals and mixtures thereof. Suitable non-metal conducting materials for forming the electrode of the electrocatalyst of the present invention are selected from the group consisting of carbon derived materials, ceramics, polymers, metal oxides and mixtures thereof. The finely dispersed conducting catalyst deposited on the electrode comprises an element selected from the group consisting of Group IB metals, Group VIB metals, Group VIII metals and mixtures thereof. The material from which the electrode is made may be in the form of a rod, grid, plate or felt material. In a preferred embodiment of the present invention, the electrode is covered with a layer of a conducting polymer and the finely dispersed conducting catalyst is deposited on the conducting polymer. Suitable materials from which the conducting polymer is formed include teflon, polyaniline, polypyrrole, perfluorinated membranes, polymeric fluorocarbon copolymer, acrylic polymers, metacrylic polymers and mixtures thereof.

The process of the present invention comprises an electrocatalytic process for partial oxidation of a methane containing gas which advantageously combines the advantages of both an electrolytic process and catalytic process for converting methane to a higher value hydrocarbon. The electrolytic process comprises preparing the composite electrocatalyst of the present invention as set forth above and thereafter contacting a methane containing gas with the composite electrocatalyst in an electrolytic cell under electrochemical conditions so as to partially oxidize the methane.

The process of the present invention employing the electrocatalyst of the present invention offers an efficient and economical mechanism for converting methane to more valuable hydrocarbon products.

DETAILED DESCRIPTION

The present invention is drawn to an improved electrocatalyst and an improved electrocatalytic process and, more particularly, a composite electrocatalyst for use in the partial oxidation of methane by an electrolytic process.

In accordance with the process of the present invention, methane is oxidized in an electrolytic cell having an anode, a cathode and an electrolyte solution media. In accordance with the present invention, the anode is in the form of the electrocatalyst of the present invention, the details of which will be set forth hereinbelow. The electrochemical process of the invention results in the partial oxidation of methane, forming a methane containing gas to yield oxygenated hydrocarbons of light molecular weight under moderate processing conditions.

The process of the present invention employs a standard electrolytic cell. In the case of a compact electrocatalyst, that is where the finely dispersed catalyst material is deposited on a non-porous electrode, the procedure involves the reactant gas; in this case, a methane containing gas, diffusing towards the electrocatalyst of the present invention through an electrolytic solution in which a cathode is also immersed. Where a porous electrocatalyst is employed, that is where the catalyst is in the form of a finely dispersed particle deposited on a porous electrode, i.e. felt material, grid or the like; the reactant gas would preferably diffuse through the porous electrode in order to avoid gas solubility and diffusion limitations. The foregoing are typical of standard electrolytic operations.

The reactant gases used in the process of the present invention comprise pure methane, methane diluted in hydrogen and an alternating pulse of methane and hydrogen. During the electrolytic operation, when pure methane is employed as the reactant gas, the methane constantly flows towards or through the electrocatalyst. When diluted methane is used as a reactant gas, the methane flows towards or through the electrocatalyst in a constant or pulsed manner with hydrogen or alternately with hydrogen and methane. By loading the electrocatalyst with hydrogen, the catalytic activity is improved.

The electrolytic solution used in the process of the present invention may be an acid, a basic or a neutral pH solution. Typical acid solutions include sulphuric acid, perchloric acid and the like. Typical base solutions include sodium hydroxide, ammonium hydroxide and the like. In addition, ionic salts might be used as the electrolytic solution. Such salts include potassium nitrate, sodium sulfate and the like. In addition, ionic mediators such as Fe(III), Cr(III), Co(III), Ce(IV) or Cd(II) might also be used in solution.

As noted above, the anode employed in the process of the present invention is in the form of an electrocatalyst in accordance with the present invention. The electrocatalyst is a composite electrocatalyst comprising an electrode having a finely dispersed electronically conductive catalyst deposited thereon. The catalyst may be deposited in any known manner depending on its form such as by painting, electronically deposited, etc. The electrode can be in the form of a compact or porous material such as, for example, a rod, a plate, a grid or felt material. The material from which the electrode is formed is selected from the group of materials consisting of metals, metal alloys, non-metal conducting materials and mixtures thereof. The metals and metal alloys which form the electrode of the composite electrode catalyst contain an element selected from the group consisting of Group IB metals, Group VIB metals, Group VIII metals and mixtures thereof. Particularly suitable materials contain an element selected from the group consisting of Au, Fe, Ag, Pt, Ir, Rh, Pd, Steel, Mo, Ni and mixtures thereof. The most preferred materials from which the electrode is formed contain an element selected from the group consisting of Ag, Fe, Steel, Ni and mixtures thereof. In the event the electrode is formed from a non-metal conducting material, the non-metal conducting materials most suitable are selected from the group consisting of carbon derived materials, ceramics, polymers, metal oxides and mixtures thereof.

The catalyst deposited on the electrode is a finely dispersed conducting material which contains an element selected from the group consisting of Group IB metals, Group VIB metals, Group VIII metals and mixtures thereof. The catalyst material is finely dispersed on the electrode in known manner as is commonly practiced as described above.

It has been found that the smaller the particle size of the finely dispersed catalyst material, the better the catalytic activity associated with the electrocatalyst. The particle size of the material particle dispersed on the electrode is about between 0.0001 $\mu$m to about 800 $\mu$m and preferably from about 0.001 $\mu$m to about 200 $\mu$m. The thickness of the finely dispersed conducting catalyst layer should be as uniform as possible in order to provide effective activity. The thickness requirements of the dispersed conducting catalyst layer are balanced so as to insure structural integrity while at the same time employing an economic amount of catalyst material. It has been found that catalyst layers of 0.01 $\mu$m exhibit the necessary structural integrity and, generally, thicknesses of greater than 2 $\mu$m are undesirable for economic reasons.

In a preferred embodiment of the electrocatalyst of the present invention, a conducting polymer layer is deposited on the electrode and the finely dispersed catalyst material is deposited on the conducting polymer material. The presence of the conducting polymer improves the dispersion of the finely deposited catalyst on the electrode thereby requiring use of less catalyst material. Suitable conducting polymer materials are selected from the group consisting of teflon, polyaniline, polypyrrole, perfluorinated membranes, polymeric fluorocarbon copolymer, acrylic polymers, metacrylic polymers and mixtures thereof, and the most preferred materials are selected from the group consisting of polypirrol and perfluorinated polymers and mixtures thereof. The thickness of the conducting polymer layers should not exceed 5.0 $\mu$m and, preferably should not exceed 1.0 $\mu$m in order to avoid unreasonable electrical resistance.

The electrolytic cell may be operated in the mode of a fuel cell by the reduction of oxygen at the cathode so as to produce $H_2O$. When the cell is operated in this mode, no electrical current need be applied. The chemical products obtained when operating the electrochemical cell as a fuel cell are similar to those obtained when operating the electrolytic cell under the process conditions set forth below. The advantage of operating the electrochemical cell as a fuel cell is that no electrical current need be applied. This operation is exemplified hereinbelow in Example IV.

As noted above, the process of the present invention combines electrolytic processing technology and catalytic processing technology for converting methane to a higher oxidized product. The electrocatalytic process of the present invention is conducted under the following operating parameters:

Temperature: 0°–200° C., preferably 20° to 70° C.;
Pressure: 0.5–100 atm., preferably 0.8 to 30 atms.
Voltage: 0 to 20 volts applied either constant, alternating or pulses; and
Current 0 to 1.0 amps $cm^{-2}$, preferably 0 to 0.5 amps $cm^{-2}$ applied either constant, alternating or pulsed.

By loading the electrocatalyst with hydrogen, that is, feeding hydrogen to the electrocatalyst with methane pulsing alternating with methane and hydrogen, the conversion of methane per gram of catalyst is improved, i.e., catalyst activity. As noted above, methane may be fed to the electrocatalyst either with hydrogen or alternating pulsed with hydrogen and methane.

In addition, the cathode of the electrochemical cell may take the form of the composite electrocatalyst described above. In this case, the anode and cathode may be selectively alternated during the electrolytic process thereby extending the life of the elements.

The invention will be further illustrated by the following examples which are in no way intended to be limiting.

EXAMPLE I

Example I was run in order to demonstrate that known catalysts used in the oxidation of methane are ineffective when employed in the electrocatalytic process in accordance with the present invention. The electrochemical cell employed in the examples is of known construction and consists of (1) a platinum anode, (2) a reference electrode of Ag/AgCl, (3) an anode in the form of known anodes or in the form of the electrocatalyst of the present invention, (4) a methane bubbling tube, and (5) a condenser to trap the volatile products produced during the electrocatalytic process. The collected products in all of the examples were analyzed by gas chromatography. The electrical parameters employed in the electrocatalytic processes were controlled by a programmed potentiostat as is known in the art.

Three separate runs were carried out using the electrochemical cell described above. All of the reactions were carried out at a temperature of 25° C. The cell voltage was pulsed at −0.2 volts for 100 seconds and then at +0.64 volts for 50 seconds. In the first run, the anode employed was a conventional catalyst comprising a Pd wire. The electrolytic solution employed in the electrochemical cell was a 0.6 Molar $HClO_4$ solution. In the second run, the anode employed was a known catalyst comprising silver particles dispersed on a Pd wire. The electrolytic solution employed in the second run comprised a solution of $2 \times 10^{-6}$ Molar $Ag^+$ and 0.5 Molar $HClO_4$. Run 3 was conducted using the same anode as employed in Run 2 with an electrolytic solution comprising $2 \times 10^{-6}$ Molar $Ag^+$, 0.5 Molar $HClO_4$ and $10^{-3}$ Molar $Fe^{3+}$.

The results of the three runs set forth above may be summarized as follows. Run 1 evidenced a strong methane adsorption on the anode; however, no oxidation products were created. Run 2 was characterized by a competitive adsorption of Ag-methane on the anode; however, again, as was the case with Run 1, no oxidation products of methane were observable. Run 3 resulted in a dissolution-rearrangement cycle of silver. A slight oxidation of methane was observed but was not readily measurable.

The foregoing examples demonstrate that known catalysts referred to in the prior art are not suitable as electrocatalysts in the electrocatalytic process of the present invention.

EXAMPLE II

In order to demonstrate the catalytic activity of an electrocatalyst in accordance with the present invention in the electrocatalytic process of the present invention, an electrochemical cell identical to that described in Example I above was employed. The electrolytic solution employed was a 0.5 Molar $HClO_4$ solution. The reaction was carried out at 25° C. and a pulsed cell voltage was kept at −0.2 volts for 100 seconds and then at +0.64 volts for 50 seconds for one hour.

The anode employed comprised an electrocatalyst in accordance with the present invention in the form of a composite catalyst comprising a compact graphite electrode having a geometric area of 48 $cm^2$ having Pd deposited thereon. The Pd was deposited on the compact electrode by electrolytic deposition. The electrocatalytic process was carried out as set forth above and the resulting products were identified as ethanol and methanol. In terms of Pd loading, the yield of methanol was 40 mmol $m_{Pd}^2$ and the yield of ethanol was 5 mmol $m_{Pd}^2$.

The foregoing demonstrates that the electrocatalyst of the present invention is effective for the oxidation of methane by the electrocatalytic process of the present invention. EXAMPLE III In order to demonstrate the preferred structure of the electrocatalyst of the present invention, four runs were used employing different electrocatalysts in accordance with the present invention. In each run the electrolytic solution was a 0.5 Molar NaOH and the cell voltage was kept constant at +300 mV.

In the first run, Pd particles were electrolytically dispersed on a graphite rod in accordance with the present invention. Approximately, 25 mg of Pd was deposited on the graphite rod and the particle size of the Pd on average was about 400 $\mu$m.

In Run 2, the anode consisted of Pd particles in the amount and size set forth above with regard to Run 1 deposited on a steel plate in the same manner as Run 1.

In Run 3, the anode consisted of an electrocatalyst having Pd particles of the size described above deposited on a Pd wire. In this third run, the total amount of Pd used in the composite electrocatalyst was 10 grams thus making the electrocatalyst extremely expensive. The Pd was deposited electrolytically.

The fourth run employed a preferred electrocatalyst as the anode which consisted of a steel electrode deposited with a layer of conducting polymer, polypyrrole, upon which the fine size Pd particles of Runs 1–3 were dispersed in an amount of approximately 25 mg of Pd. The Pd was deposited electrolytically.

The results of Example III are set forth below in Table I.

TABLE I

| Run | Catalyst | MeOH | EtOH | PrOH | $Me_2CO$ | $^{Conv}CH_4$ −1 $\mu$mol $g_{Pd}$ | Faradaic Efficiency % |
|---|---|---|---|---|---|---|---|
| 1 | Pd/Graph. | Y | Y | N | N | 56 | 6.1 |
| 2 | Pd/Steel | N | Y | N | N | 5 | 1.6 |
| 3 | Pd/Pd | N | Y | Y | N | 0.031 | 0.02 |
| 4 | Pd/pp/Steel | Y | Y | Y | Y | 240 | 2.2 | wherein Y stands for yes and N stands for no.

As can be seen from Table I, the catalytic activity, that is, the conversion of methane per gram of catalyst was far superior in Run 4 where Pd was deposited on an electrode coated with polypyrrole. The catalytic activity of the catalyst of Run 4 was approximately five times greater than that obtained in the second best run, that is, Run 1. In addition, Run 4 yielded methanol, ethanol, propanol and acetone. None of the other runs yielded all four of these products.

As can be seen from the foregoing, a catalyst wherein a layer of conducting polymer is employed allows for superior catalytic activity while, at the same time, requiring less catalyst. This superior result is believed to be attributable to the fact that the Pd particles may be more evenly dispersed on the polymer layer.

EXAMPLE IV

The electrochemical cell described above may be used as a fuel cell. In order to demonstrate the foregoing, the electrochemical cell was identical to that described above with regard to Example II except that the cathodic reaction was an oxidation reduction reaction wherein oxygen was fed to the cathode to produce $H_2O$. No current was applied. The chemical products obtained were similar to those obtained in Example II as set forth above; however, a net favorable energy balance was produced without the need of applying an external power source. This is extremely important in that the reaction is energy efficient.

EXAMPLE V

In order to demonstrate the effect of hydrogen loading on the electrocatalyst of the present invention, the electrochemical cell set up in Example III above was employed using an electrocatalyst as the anode comprising Pd particles deposited electrolytically on Pd foil. A first run was conducted wherein methane was fed to the electrocatalyst. In a second run, the electrocatalyst was loaded with hydrogen by feeding hydrogen to the electrocatalyst using an electrical current of 1.1 mamp cm$^{-2}$. The results of these runs are set forth in Table II below.

TABLE II

| Description | EtOH | PrOH | Me$_2$CO |
|---|---|---|---|
| Pd/Pd H$_2$-free | 22 | 17 | — |
| Pd/Pd H$_2$ run | 87 | 233 | — |

As can be clearly seen, Run 2 in which the electrocatalyst was loaded with hydrogen showed far greater conversion of methane than that run conducted without hydrogen loading of the electrocatalyst.

The electrocatalyst of the present invention allows for the conversion of methane to more valuable products via an electrocatalytic process. The process and electrocatalyst of the present invention offers superior advantages over other known processes for the oxidation of methane.

This invention may be embodied in other forms or carried out in other ways without departing from the spirit or essential characteristics thereof. The present embodiment is, therefore, to be considered as in all respects illustrative and not restrictive, the scope of the invention being indicated by the appended claims, and all changes which come within the meaning and range of equivalency are intended to be embraced therein.

What is claimed is:

1. An electrocatalytic process for the partial oxidation of a methane containing gas comprises:
    (1) providing an electrochemical cell having an electrolytic solution, a cathode and an anode;
    (2) preparing said anode in the form of a composite electrocatalyst comprising an electrode having finely dispersed metal particle conducting catalyst material deposited thereon wherein said metal particle has a particle size of between about 0.0001 $\mu$m to about 800 $\mu$m, said catalyst material consisting essentially of an element selected from the group consisting of Group IB metals, Group VIB metals, Group VIII metals and mixtures thereof; and
    (3) contacting said methane containing gas with said composite electrocatalyst in the electrolyte solution in the electrochemical cell under electrochemical conditions at a temperature of up to 200° C. to partially oxidize said methane at said anode.

2. An electrocatalytic process according to claim 1 wherein:
    (1) said electrode consisting essentially of a material selected from the group consisting of metals, metal alloys, non-metal conducting materials and mixtures thereof wherein:
        (a) said metals and metal alloys contain an element selected from the group consisting of Group IB metals, Group VIB metals, Group VIII metals and mixtures thereof; and
        (b) said non-metal conducting materials are selected from the group consisting of carbon derived materials, ceramics, polymers, metal oxides and mixtures thereof.

3. An electrocatalytic process according to claim 1 wherein said metal particle has a particle size of between about 0.001 $\mu$m to about 200 $\mu$m.

4. An electrocatalytic process according to claim 3 wherein said finely dispersed conducting catalyst has an average thickness of from about 0.01 $\mu$m to about 0.10 $\mu$m.

5. An electrocatalytic process according to claim 1 wherein the finely dispersed conducting catalyst has a thickness of less than or equal to 2 $\mu$m wherein the thickness is substantially uniform.

6. An electrocatalytic process according to claim 1 wherein said electrode is formed of a material selected from the group consisting of rod, grid, plate and felt materials.

7. An electrocatalytic process according to claim 1 wherein said electrode material contains a element selected from the group consisting of Au, Fe, Ag, Pt, Ir, Rh, Pd, Steel, Mo, Ni and mixtures thereof.

8. An electrocatalytic process according to claim 1 wherein said electrode material contains a element selected from the group consisting of Ag, Fe, Steel, Ni and mixtures thereof.

9. An electrocatalytic process according to claim 1 wherein said electrode comprises a non-metal conducting material selected from the group consisting of graphite and ceramic material.

10. An electrocatalytic process according to claim 1 wherein said catalyst comprises a finely dispersed metal particle containing an element selected from the group consisting of Ni, Mo, Co, Pd, Ir, Rh, Ru, Pt, Fe, Ag and mixtures thereof.

11. An electrocatalytic process according to claim 1 wherein said catalyst comprises a finely dispersed material particle containing an element selected from the group consisting of Ni, Pd, Ir, Ru and mixtures thereof.

12. An electrocatalytic process according to claim 1 providing a compact electrode.

13. An electrocatalytic process according to claim 1 providing a porous electrode.

14. An electrocatalytic process according to claim 1 including feeding oxygen to said cathode wherein said electrochemical cell acts as a fuel cell.

15. An electrocatalytic process according to claim 1 including:
    (4) preparing said cathode in the form of an electrocatalyst comprising an electrode consisting essentially of a material selected from the group consisting of metals, metal alloys, non-metal conducting materials and mixtures thereof wherein:
        (b) said metals and metal alloys contain an element selected from the group consisting of Group IB metals, Group VIB metals, Group VIII metals and mixtures thereof; and
        (b) said non-metal conducting materials are selected from the group consisting of carbon derived materials, ceramics, polymers, metal oxides and mixtures thereof.

16. An electrocatalytic process according to claim 15 wherein said cathode comprises a finely dispersed metal particle containing an element selected from the group consisting of Ni, Mo, Co, Pd, Ir, Rh, Ru, Pt, Fe, Ag and mixtures thereof deposited on said electrode.

17. An electrocatalytic process according to claim 16 wherein said cathode comprises a finely dispersed metal particle containing an element selected from the group consisting of Ni, Pd, Ir, Ru and mixtures thereof deposited on said electrode.

18. An electrocatalytic process according to claim 15 wherein said anode and said cathode are periodically alternated during said electrochemical operation.

19. An electrocatalytic process for the partial oxidation of a methane containing gas comprises:
   (1) providing an electrochemical cell having an electrolytic solution, a cathode and an anode;
   (2) preparing said anode in the form of a composite electrocatalyst comprising an electrode having a finely dispersed metal particle conducting catalyst material deposited thereon wherein said electrode is covered by a layer of a conducting polymer and said finely dispersed conducting catalyst is deposited on said conducting polymer, said catalyst material consisting essentially of an element selected from the group consisting of Group IB metals, Group VIB metals, Group VIII metals and mixtures thereof; and
   (3) contacting said methane containing gas with said composite electrocatalyst in the electrolyte solution in the electrochemical cell under electrochemical conditions at a temperature of up to 200° C. to partially oxidize said methane at said anode.

20. An electrocatalytic process according to claim 19 wherein said conducting polymer is selected from the group consisting of teflon, polyaniline, polypyrrole, perfluorinated membranes, polymeric fluorocarbon copolymer, acrylic polymers, metacrylic polymers and mixtures thereof.

21. An electrocatalytic process according to claim 20 wherein said polymer is selected from the group consisting of polypyrrole an perfluorinated polymers and mixtures thereof.

22. An electrocatalytic process according to claim 19 wherein the conducting polymer layer has a thickness of less than or equal to about 5.0 $\mu$m.

23. An electrocatalytic process according to claim 22 wherein the thickness of the conducting polymer layer is less than or equal to about 0.1 $\mu$m.

24. An electrocatalytic process for the partial oxidation of a methane containing gas comprises:
   (1) providing an electrochemical cell having an electrolytic solution, a cathode and an anode;
   (2) preparing said anode in the form of a composite electrocatalyst comprising an electrode having a finely dispersed metal particle conducting catalyst material deposited thereon wherein said metal particle has a particle size of between about 0.0001 $\mu$m to about 800 $\mu$m, said catalyst material consisting essentially of an element selected from the group consisting of Group IB metals, Group VIB metals, Group VIII metals and mixtures thereof;
   (3) contacting said methane containing gas with said composite electrocatalyst in the electrolyte solution in the electrochemical cell under electrochemical conditions at a temperature of up to 200 ° C. to partially oxidize said methane at said anode; and
   (4) conducting said electrocatalytic process at a voltage of up to 20 volts and a current of up to 1.0 A cam$^{-2}$ while said voltage and current are pulsed.

25. An electrocatalytic process according to claim 24 including applying a voltage of up to 2.0 volts.

26. An electrocatalytic process according to claim 25 including applying a current of up to 0.5 A cm$^{-1}$.

27. An electrocatalytic process according to claim 24 including carrying out said electrolytic process at a temperature of about between 20° to 70° C.

28. An electrocatalytic process according to claim 24 including conducting the electrolytic process at a pressure of between 0.5 to 100 atms.

29. An electrocatalytic process according to claim 24 including conducting the electrolytic process at a pressure of between 0.8 to 30 atms.

30. An electrocatalytic process for the partial oxidation of a methane containing gas comprises:
   (1) providing an electrochemical cell having an electrolytic solution, a cathode and an anode;
   (2) preparing said anode in the form of a composite electrocatalyst comprising an electrode having a finely dispersed metal particle conducting catalyst material deposited thereon wherein said metal particle has a particle size of between about 0.0001 $\mu$m to about 800 $\mu$m, said catalyst material consisting essentially of an element selected from the group consisting of Group IB metals, Group VIB metals, Group VIII metals and mixtures thereof;
   (3) contacting said methane containing gas with said composite electrocatalyst in the electrolyte solution in the electrochemical cell under electrochemical conditions at a temperature of up to 200° C. to partially oxidize said methane at said anode; and
   (4) conducting said electrocatalytic process at a voltage of up to 20 volts and a current of up to 1.0 A cam$^{-2}$ while said voltage and current are alternatingly pulsed.

31. An electrocatalytic process for the partial oxidation of a methane containing gas comprises:
   (1) providing an electrochemical cell having an electrolytic solution, a cathode and an anode;
   (2) preparing said anode in the form of a composite electrocatalyst comprising an electrode having a finely dispersed metal particle conducting catalyst material deposited thereon wherein said metal particle has a particle size of between about 0.0001 $\mu$m to about 800 $\mu$m, said catalyst material consisting essentially of an element selected from the group consisting of Group IB metals, Group VIB metals, Group VIII metals and mixtures thereof;
   (3) contacting said methane containing gas with said composite electrocatalyst in the electrolyte solution in the electrochemical cell under electrochemical conditions at a temperature of up to 200° C. to partially oxidize said methane at said anode; and
   (4) conducting said electrocatalytic process at a voltage of up to 20 volts and a current of up to 1.0 A cam$^{-2}$ while said voltage and current are constantly pulsed.

32. An electrocatalytic process for the partial oxidation of a methane containing gas comprises:
   (1) providing an electrochemical cell having an electrolytic solution, a cathode and an anode;
   (2) preparing said anode in the form of a composite electrocatalyst comprising an electrode having a finely dispersed metal particle conducting catalyst material deposited thereon wherein said metal particle has a particle size of between about 0.001 $\mu$m to about 800 $\mu$m, said catalyst material consisting essentially of an element selected from the group consisting of Group IB metals, Group VIB metals, Group VIII metals and mixtures thereof;

(3) contacting said methane containing gas with said composite electrocatalyst in the electrolyte solution in the electrochemical cell under electrochemical conditions at a temperature of up to 200° C. to partially oxidize said methane at said anode; and (4) feeding hydrogen and methane to said electrocatalyst to load same.

33. An electrocatalytic process according to claim 32 wherein said hydrogen is fed with said methane.

* * * * *

UNITED STATES PATENT AND TRADEMARK OFFICE
CERTIFICATE OF CORRECTION

PATENT NO. : 5,051,156

DATED : September 24, 1991

INVENTOR(S) : Benjamin Scharifker et al.

It is certified that error appears in the above-identified patent and that said Letters Patent is hereby corrected as shown below:

Column 7, Claim 1, line 47, before "finely" insert --a--;

Column 8, Claim 15, line 56, delete "(b)" and substitute --(a)--;

Column 9, Claim 23, line 45, delete "0.1" and substitute --1.0--;

Column 10, Claim 32, line 64, delete "0.001" and substitute --0.0001--.

Signed and Sealed this

Ninth Day of March, 1993

*Attest:*

STEPHEN G. KUNIN

*Attesting Officer*  Acting Commissioner of Patents and Trademarks

UNITED STATES PATENT AND TRADEMARK OFFICE
CERTIFICATE OF CORRECTION

PATENT NO. : 5,051,156

DATED : September 24, 1991

INVENTOR(S) : BENJAMIN SCHARIFKER ET AL.

It is certified that error appears in the above-identified patent and that said Letters Patent is hereby corrected as shown below:

Column 5, line 65, "$mp_d^2$" should read --$mp_d^{-2}$--.

Column 5, line 66, "$mp_d^2$" should read --$mp_d^{-2}$--.

Column 6, line 2, "EXAMPLE III" should be a heading on a new line.

Signed and Sealed this

Twentieth Day of April, 1993

Attest:

MICHAEL K. KIRK

*Attesting Officer*  *Acting Commissioner of Patents and Trademarks*